(12) United States Patent
Cabezas et al.

(10) Patent No.: US 6,745,345 B2
(45) Date of Patent: Jun. 1, 2004

(54) METHOD FOR TESTING A COMPUTER BUS USING A BRIDGE CHIP HAVING A FREEZE-ON-ERROR OPTION

(75) Inventors: Rafael G. Cabezas, Austin, TX (US); Dhirendra Dhopeshwarkar, Austin, TX (US); Robert G. Kovacs, Austin, TX (US); Arthur J. Tysor, Buda, TX (US)

(73) Assignee: International Business Machines Corporation, Armonk, NY (US)

( * ) Notice: Subject to any disclaimer, the term of this patent is extended or adjusted under 35 U.S.C. 154(b) by 598 days.

(21) Appl. No.: 09/730,406

(22) Filed: Dec. 4, 2000

(65) Prior Publication Data

US 2002/0095624 A1 Jul. 18, 2002

(51) Int. Cl.$^7$ ............................................. G06F 11/00
(52) U.S. Cl. .............................. 714/41; 714/56; 714/33
(58) Field of Search .............................. 714/41, 40, 33, 714/56

(56) References Cited

U.S. PATENT DOCUMENTS

| 5,602,989 | A | * | 2/1997 | Aria .............................. 714/43 |
| 5,701,409 | A | * | 12/1997 | Gates ........................... 714/41 |
| 5,715,433 | A | * | 2/1998 | Raghavan et al. ............ 703/21 |
| 5,815,647 | A | * | 9/1998 | Buckland et al. .............. 714/3 |
| 6,145,044 | A | * | 11/2000 | Ogura ......................... 710/311 |
| 6,311,296 | B1 | * | 10/2001 | Congdon ....................... 714/56 |
| 6,330,694 | B1 | * | 12/2001 | Hong et al. .................... 714/56 |
| 6,519,718 | B1 | * | 2/2003 | Graham et al. ................ 714/41 |
| 6,526,525 | B1 | * | 2/2003 | Chang .......................... 714/40 |

* cited by examiner

Primary Examiner—Nadeem Iqbal
Assistant Examiner—Timothy M. Bonura
(74) Attorney, Agent, or Firm—Diana L. Roberts; Edmond A. DeFrank

(57) ABSTRACT

A method for testing a computer bus using a bridge chip having a freeze-on-error option that enables a computer system's central processing unit (CPU) to recover and continue processing even when the computer bus is not functional. The testing method of the present invention remains transparent to a user and can be accomplished while performing standard diagnostics tests. In general, the present invention injects an input/output (I/O) error into a specific bus slot of the computer bus to test the functionality (such as the error recovery capability) of the bus. The present invention then recovers from the failure condition without having the computer system shutdown or stop working and without having to restart the computer system. More specifically, the method for testing a computer bus according to the present invention includes enabling the freeze-on-error option on the bridge chip, injecting an error into the specified computer bus slot and recovering from the injected error. The error recover capability of the computer bus is determined by examining the status of the bus slots both with the injected error condition and without the injected error condition.

19 Claims, 4 Drawing Sheets

METHOD FOR TESTING A COMPUTER BUS USING A BRIDGE CHIP HAVING A FREEZE-ON-ERROR OPTION

BACKGROUND OF THE INVENTION

1. Field of the Invention

The present invention relates in general to computer buses and more particularly to a method for testing a computer bus using a bridge chip having a freeze-on-error option that permits a central processing unit (CPU) to recover and continue processing even when there is an error within the bus.

2. Related Art

Computer buses are an integral and vital part of a computer system that provide a path by which data travels within the computer system. Typically, the computer bus is a collection of wires that connects one part of the computer with another. For example, an internal bus connects internal computer components to a central processing unit (CPU) and main memory, while an expansion bus connects expansion boards (also called adapters) to the CPU and main memory. A computer bus includes a data bus, which transfers the data, and an address bus, which transfers information regarding where the data should go. The expansion bus includes a bus slot whereby an expansion board (or adapter) may be inserted to give the computer added capabilities. The expansion board is a printed circuit board such as, for example, a video adapter, graphics accelerator, sound card, accelerator board and an internal modem.

One popular type of computer bus is the local bus architecture. Local bus architecture includes both the Industry Standard Architecture (ISA) expansion bus and the Peripheral Component Interconnect (PCI) local bus. In general, the PCI local bus is a newer architecture than the ISA architecture and provides fast throughput that allows data to be exchanged rapidly by connecting directly or nearly directly to the CPU. One way of connecting the local bus architecture to the CPU is by using a bridge chip. A bridge chip is an integrated circuit that connects, for example, an expansion board within a PCI slot directly to the CPU of the computer. This brings the expansion board closer to the CPU in terms of data transfer and increases system performance.

An optional feature that is available on some bridge chips is a freeze-on-error option. Generally, the freeze-on-error option is on a PCI-to-PCI bridge chip and enables the CPU of the computer system to continue processing (and prevent computer system freezing, lock-up or shutdown) even when there is an error within the computer bus or an expansion board within a bus slot. When an error is detected the PCI-to-PCI bridge chip having the freeze-on-error option enabled freezes the expansion board's PCI bus slot thereby halting the expansion board's processing. This is a large advancement over previous bridge chips that froze the entire computer bus when an error occurred within one of the bus slots, forcing the entire computer system to halt processing and stop working. Thus, a PCI-to-PCI bridge chip having an enabled freeze-on-error option permits the CPU of a computer system to continue processing even when an error has occurred within a computer bus slot or expansion board.

Accordingly, what is needed is a method of testing a computer bus using a bridge chip having a freeze-on-error option in such a way as to assure proper functionality (such as, for example, error recovery capabilities) of the computer bus (including the bus slots). What is also needed is a method of testing the computer bus that takes advantage of the freeze-on-error option and tests the computer bus and bus slots without causing the computer system to freeze or stop working. Moreover, what is needed is a method for testing that is preferably transparent to a user such that the method does not require the user to perform any special procedure (such as restarting the computer system).

SUMMARY OF THE INVENTION

To overcome the limitations in the prior art as described above and other limitations that will become apparent upon reading and understanding the present specification, the present invention includes a method for a testing a computer bus using a bridge chip having a freeze-on-error option that permits the central processing unit (CPU,) to recover and continue processing even when there is an error within the bus. The present invention provides a method of testing the computer bus by conducting a test that remains transparent to a user and can be accomplished while performing standard diagnostics tests. In particular, the present invention injects an error into a specific bus slot of the computer bus to test the functionality of the computer bus. The present invention then recovers from the injected error condition without having the computer system shutdown or stop working and without having to restart the computer system.

The present invention is especially useful in checking the error recovery capabilities of a computer bus. The testing method of the present invention takes advantage of the bridge chip's freeze-on-error option in order to test the computer bus without causing the computer system to stop operating. More specifically, the method for testing a computer bus according to the present invention includes enabling the freeze-on-error option on the bridge chip and injecting an error into the bus slot. The status of the bus slot with the injected error condition is determined, and the bus slot recovers from the injected error condition. Again the status of the bus slot without the injected error condition is determined. The error recovery capabilities of the computer bus are determined by examining the status of the bus slot both with the injected error condition and without the injected error condition.

Other aspects and advantages of the present invention as well as a more complete understanding thereof will become apparent from the following detailed description, taken in conjunction with the accompanying drawings, illustrating by way of example the principles of the invention. Moreover, it is intended that the scope of the invention be limited by the claims and not by the preceding summary or the following detailed description.

BRIEF DESCRIPTION OF THE DRAWINGS

The present invention can be further understood by reference to the following description and attached drawings that illustrate the preferred embodiments. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction

Bridge chips that connect a computer's CPU with a computer bus are currently available with a freeze-on-error option. This option enables the CPU to continue processing even if the computer bus stops functioning. For example, a RS/6000 computer system manufactured by International Business Machines (IBM) Corporation, located in Armonk, N.Y., is programmed to stop operating in the event of a computer bus error. However, if the RS/6000 has a freeze-on-error option enabled a single error in a computer bus will not cause the entire computer system to shut down. Especially in the case of a computer system having a plurality of CPUs, shutting down the computer system can be quite time-consuming and expensive due to lost working time.

The present invention includes a method for testing the computer bus of a computer system by using a bridge chip having a freeze-on-error option. This testing method takes advantage of the freeze-on-error option by injecting an error into the bus slot and recovering from the error without causing the entire computer system to shutdown. In addition, the testing method is transparent to a user and does not require any user intervention.

II. Exemplary Operating Environment

The following discussion is designed to provide a brief, general description of a suitable environment in which the present invention may be implemented. It should be noted that FIG. 1 depicts only one of several ways in which the present invention may be implemented.

Figure 1:
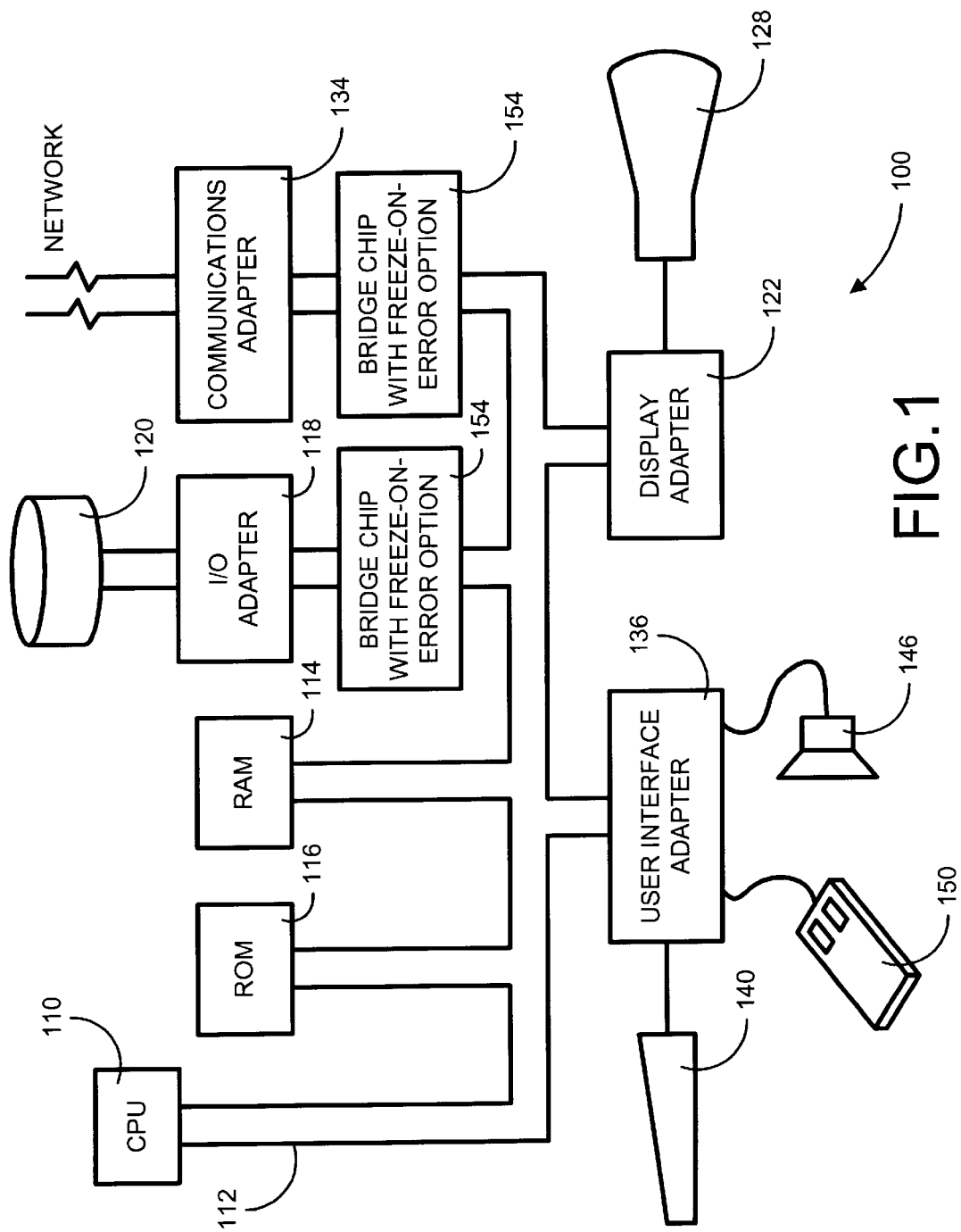
FIG. 1 is a block diagram of a computer system incorporating the present invention and is shown for illustrative purposes only.

FIG. 1 is a block diagram of a computer system incorporating the present invention and is shown for illustrative purposes only. In particular, a computer system 100 includes any suitable central processing unit (CPU) 110, such as a standard microprocessor, and any number of other objects interconnected by a computer bus 112. It should be noted that the computer system 100 may also include a plurality of CPUs 110, such as may be used in a mainframe computer. For purposes of illustration, the computer system 100 includes memory such as random-access memory (RAM) 114, read-only memory (ROM) 116, and storage devices (such as hard disk or disk drives 120) connected to the computer bus 112 by an input/output (I/O) adapter 118. The computer system 100 further includes a display adapter 122 for connecting the computer bus 112 to a suitable display device 128. A communications adapter 134 connects the computer bus 112 with a network. In addition, a user interface adapter 136 is capable of connecting the computer bus 112 to other user interface devices, such as a keyboard 140, a speaker 146, a mouse 150 and a touchpad (not shown).

A bridge chip having a freeze-on-error option 154 connects storage devices 120 through the I/O adapter 118 to the computer bus 112 and CPU 110. In addition, the bridge chip 154 connects the network through the communications adapter 134 to the computer bus 112 and CPU 110. As discussed above and below, the freeze-on-error option on the bridge chip 154 prevents the computer system 100 from shutting down by enabling the CPU 110 to recover and continue processing even after an error within the computer bus 112 has occurred.

In a preferred embodiment, a graphical user interface (GUI) and an operating system (OS) reside within a computer-readable media and contain device drivers that allow one or more users to manipulate object icons and text on the display device 128.

Any suitable computer-readable media may retain the GUI and OS, such as, for example, the RAM 114, ROM 116, hard disk or disk drives 120 (such as magnetic diskette, magnetic tape, CD-ROM, optical disk or other suitable storage media).

Figure 2:
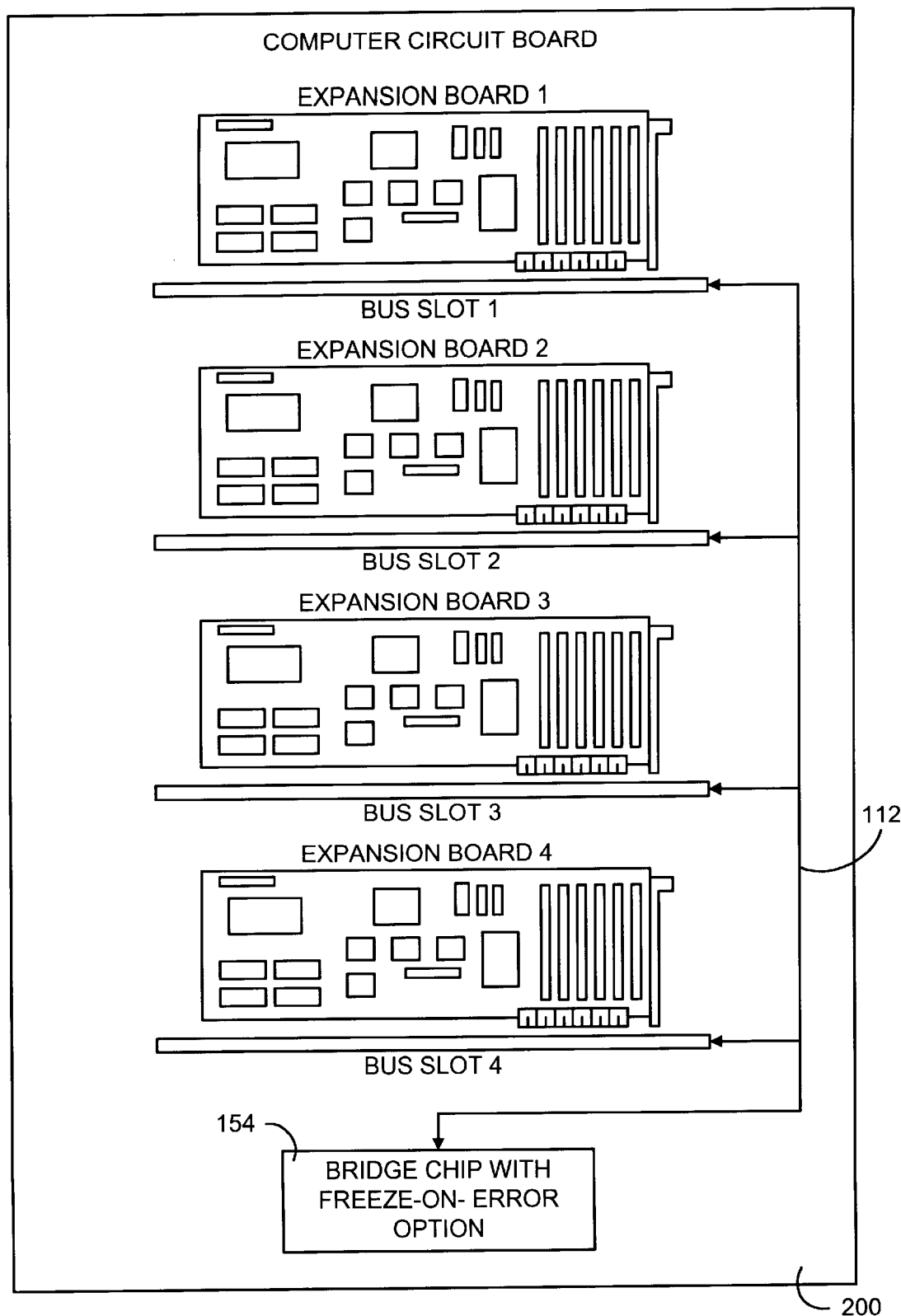
FIG. 2 illustrates the computer circuit board of the computer system of FIG. 1 and the components of the present invention.

FIG. 2 illustrates the computer circuit board 200 of the computer system 100 of FIG. 1 and the components of the present invention. In particular, the computer circuit board 200 preferably includes a plurality of expansion boards (shown as Expansion Boards 1–4) and bus slots (shown as Bus Slots 1–4). The expansion boards are designed for insertion into the bus slots such that communication between each respective expansion board and bus slot is established. By way of example, as shown in FIG. 2, Expansion Board 1 inserts into Bus Slot 1, Expansion Board 2 inserts into Bus Slot 2, Expansion Board 3 inserts into Bus Slot 3 and Expansion Board 4 inserts into Bus Slot 4.

Each of the bus slots is connected to the bridge chip having the freeze-on-error option 154 by the computer bus 112. In this way, the expansion boards and bus slots are able to communicate with the bridge chip 154 and the CPU 110 of the computer system 100. In the preferred embodiment of FIG. 2, the bridge chip 154 controls up to four bus slots. It should be noted, however that although FIG. 2 illustrates the bridge chip 154 controlling four bus slots, those skilled in the art will appreciate that the bridge chip 154 may be capable of controlling a fewer or a greater number of bus slots than illustrated.

III. General Operation

In general, the method of the present invention tests the computer bus (including the bus slot) by injecting an error into the bus. Preferably, the injected error is capable of causing the bus slot or the expansion board within the bus slot to stop processing. The error condition is then recovered from and the status of the bus slot is returned to normal. The testing is completely transparent to a user, requires no user intervention (such as restarting the computer system) and ensures proper functionality (such as error recovery capability) of the computer bus.

Figure 3:
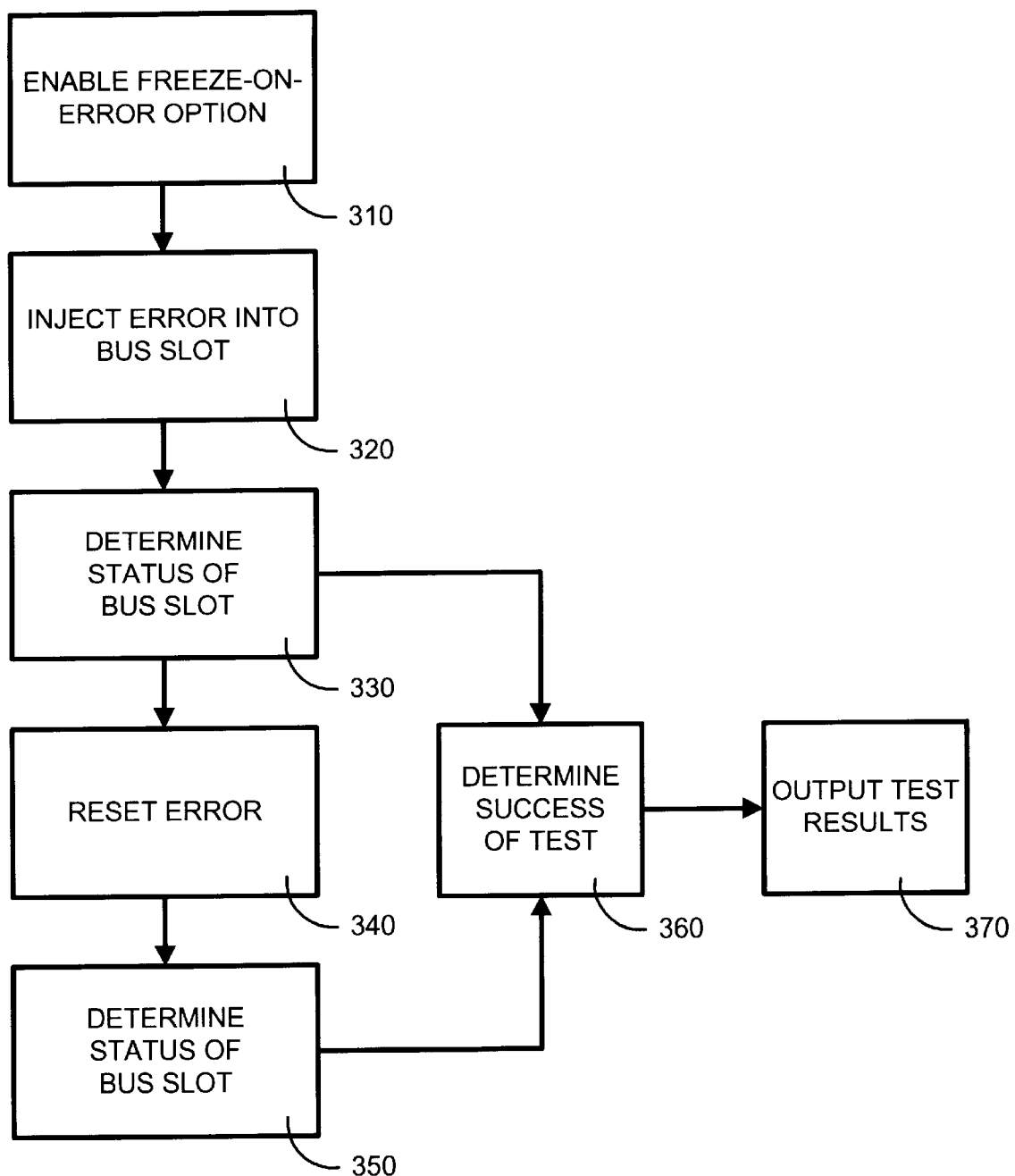
FIG. 3 is a general flow diagram of the method of the present invention.

FIG. 3 is a general flow diagram of the method of testing the computer bus according to the present invention. Initially, the freeze-on-error option of the bridge chip is enabled (box 310) to ensure that the freeze-on-error option is operating. This also ensures that the bridge chip supports the freeze-on-error option. Next, an error is injected into a bus slot (box 320) that is part of the computer bus. Preferably, this injected error is an error that is capable of causing the bus slot to stop operating (such as, for example, a data parity error). The status of the bus slot is then determined (box 330) to establish whether the injected error has caused the bus slot to stop operating.

This error condition is then reset (box 340) and the status of the bus slot is determined again (box 350) to establish whether the bus slot is once again functional. The success of the test is determined (box 360) by using the output from box 330 and the output from box 350 to establish the status of the bus slot. These test results are output for use by a diagnostic application, presentation to a user or other suitable purpose (box 370).

IV. Operational Details and Working Example

Figure 4:
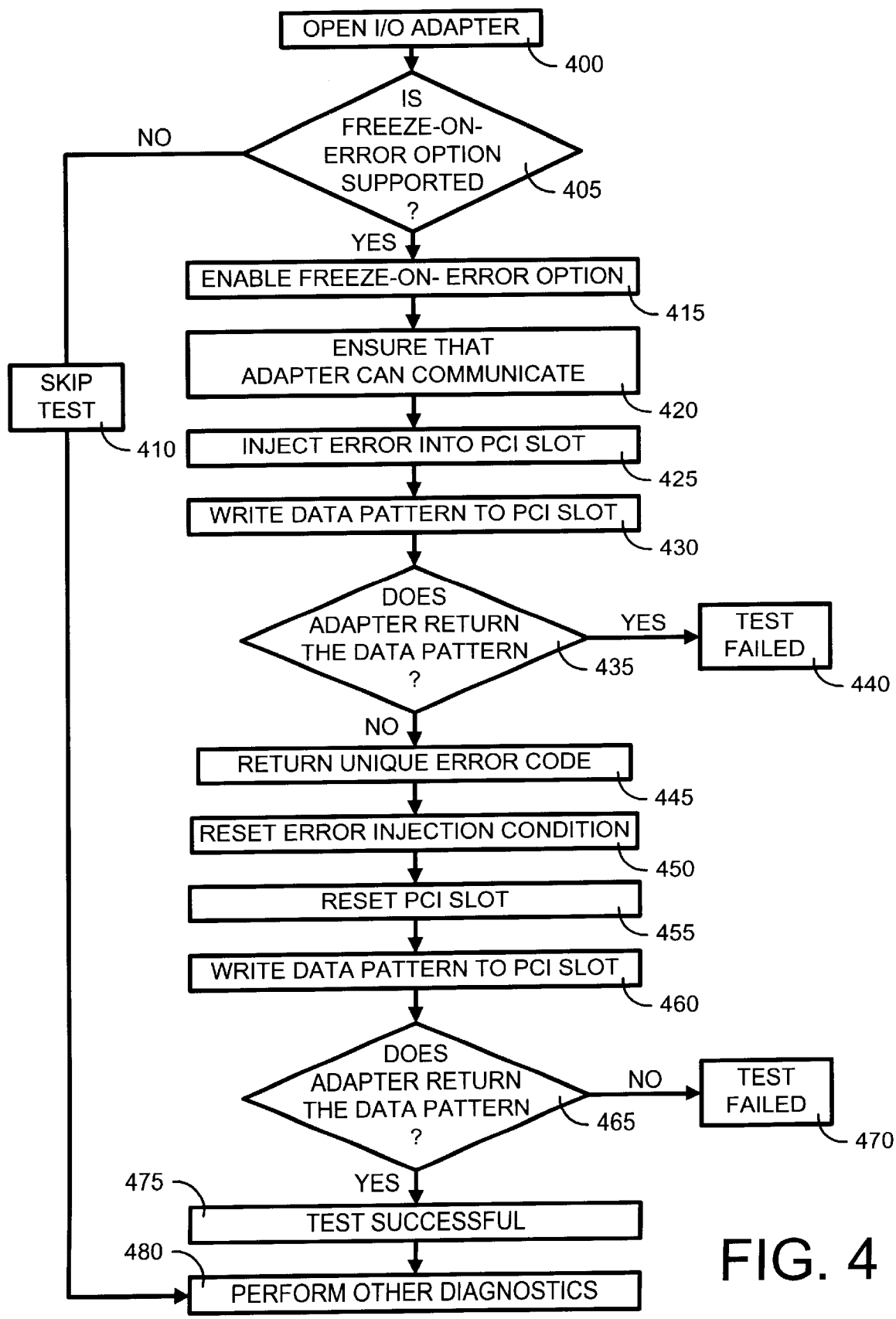
FIG. 4 is a flow diagram of a working example illustrating the detailed operation of a preferred embodiment of the present invention.

FIG. 4 is a flow diagram of a working example illustrating the detailed operation of a preferred embodiment of the present invention. It should be noted that the present invention may be implemented in a variety of ways and actual implementation may vary from the following description. In this working example, the computer system used is a RS/6000 S80 computer system manufactured by International Business Machines (IBM) Corporation, located in Armonk, N.Y. Further, in this working example the expansion board is an adapter that is inserted into a PCI slot, the computer bus is a PCI local bus architecture and the bridge chip having a freeze-on-error option is a PCI-to-PCI bridge chip having the freeze-on-error option.

The testing procedure of this working example of the present invention initially opens the adapter within the PCI bus slot to be tested by loading a diagnostic driver (box 400). Next, the present invention verifies that the freeze-on-error option is supported (box 405). If not, then this testing procedure is skipped (box 410) and other diagnostics may be performed. If the freeze-on-error option is supported, the freeze-on-error option is enabled on the PCI-to-PCI bridge chip (box 415). The testing procedure then verifies that the adapter can communicate and is functional (box 420). In this working example, this entails executing any required test cases such that the proper environment for a read and write operation to the adapter is provided. Moreover, verification involves ensuring that the adapter is responding correctly prior to any further testing by the present invention. It should be noted that the read and write environment is dependent on the type and brand of adapter, and therefore some adapters may not require this verification process.

Once the present invention verifies that the adapter can communicate an error is injected into the PCI slot (box 425). In this working example, the error is a data parity error, which is an error that causes the PCI slot to stop functioning. Alternatively, other types of error other than a data parity error may be injected into the PCI slot, and depends on the firmware of the computer system. A data pattern is then written to the PCI slot (box 430) and the present invention then determines whether the adapter returns the data pattern (box 435). If the data pattern is returned, the test fails (box 440) and the diagnostic application reports an error. Otherwise, the adapter returns a unique error code (box 445) indicating that the PCI slot is non-functional. In this working example, the PCI slot returns a unique error code consisting of a series of all "ones", thus indicating that the error has been successfully injected. It should be noted, however, that the unique error code is individual to the diagnostic application and may be different from that used in this working example.

The error injection condition is then reset (box 450) and the error injection state is recovered from or released. Next, the PCI slot is reset (box 455). In this working example, the PCI slot is reset by sending a reset signal active for a minimum of 100 milliseconds to the firmware. A data pattern is then written to the adapter controlled by the PCI slot (box 460). It should be noted that in this working example the data pattern used in box 430 and box 460 are the same, but may be different in other implementations. The present invention then determines whether the adapter returns the data pattern (box 465). If not, this indicates that the PCI slot is still non-functional, and the test fails (box 470). If the adapter does return the data pattern, this indicates that the PCI slot has been returned to full functionality and the test is successful (box. 475). Other diagnostic tests may then be performed (box 480) and the adapter is closed by unloading the diagnostics driver. This test just described is usually performed first and in conjunction with a variety of other diagnostics tests.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A method for testing a computer bus having a computer bus slot by using a bridge chip comprising:

injecting an error into the computer bus slot;

using a freeze-on error option on the bridge chip to ensure that at least a portion of the computer bus continues to operate;

resetting the injected error and determining a status of the computer bus slot both with the injected error and without the injected error; and ensuring that an adapter within the computer bus slot can communicate using the computer bus;

wherein determining the status of the computer bus slot further comprises writing a first data pattern to the slot having the adapter disposed therein and determining whether the adapter returns the first data pattern.

2. The method of claim 1, further comprising enabling the freeze-on-error option to ensure that the freeze-on error option is operational.

3. The method of claim 2, wherein the bridge chip is a Peripheral Component Interconnect-to-Peripheral Component Interconnect bridge chip.

4. The method of claim 1, wherein the injected error is capable of freezing the computer bus slot thereby halting processing of an adapter.

5. The method of claim 4, wherein the injected error is a data parity error.

6. The method of claim 4, wherein determining the status of the computer bus with the injected error further comprises determining whether the injected error has frozen the computer bus slot and caused the adapter within the computer bus slot to stop processing.

7. The method of claim 4, wherein determining the status of the computer bus without the injected error further comprises determining whether the computer bus slot is functional and the adapter within the computer bus slot is processing.

8. The method of claim 1, wherein the success of the computer bus testing is determined using a first set of intermediate test results obtained from the computer bus slot during the injected error and a second set of intermediate test results obtained from the computer bus slot without the injected error.

9. The method of claim 1, wherein final test results are obtained by comparing a first set of intermediate test results obtained from the computer bus slot during the injected error and a second set of intermediate test results obtained from the computer bus slot without the injected error.

10. The method of claim 1, wherein ensuring that the adapter can communicate further comprises performing read and write operations to the adapter.

11. The method of claim 1, wherein determining whether the adapter returns the first data pattern further comprises:
concluding the computer bus slot has failed the testing if the first data pattern is returned; and
continuing the computer bus testing if the adapter returns a unique error code.

12. The method of claim 1, wherein determining the status of the computer bus slot without the injected error further comprises:
writing a second data pattern to the computer bus slot having the adapter disposed therein; and
determining whether the adapter returns the second data pattern.

13. The method of claim 12, wherein determining whether the adapter returns the second data pattern further comprises:
concluding the computer bus slot has failed the testing if the second data pattern is not returned; and
concluding the computer bus slot has passed the testing if the second data pattern is returned.

14. The method of claim 12, wherein the first and second data patterns are the same.

15. A method for testing a computer bus having a computer bus slot, the computer bus contained within a computer system having a central processing unit, the method comprising:
providing a bridge chip that enables communication between the computer bus and the central processing unit;
enabling a freeze-on-error option within the bridge chip that enables the central processing unit to continue processing even if there is an error within the computer bus;
injecting an error into the computer bus slot;
resetting the error within the computer bus slot;
determining a functionality of the computer bus slot by examining a status of the computer bus slot during the error injection and after error resetting; and
ensuring that an adapter within the computer bus slot can communicate using the computer bus;
wherein determining the functionality of the computer bus further comprises writing a first data pattern to the slot having the adapter disposed therein and determining whether the adapter returns the first data pattern.

16. The method of claim 15, wherein the error injected into the computer bus slot is an error capable of causing the computer bus slot to stop functioning.

17. The method of claim 16, wherein the testing is performed without having to restart the computer system.

18. The method of claim 15, wherein the testing is transparent to a user of the computer system and does not require intervention of the user.

19. A method for testing a adapter within a Peripheral Component Interconnect bus slot, the Peripheral Component Interconnect bus slot being connected to a Peripheral Component Interconnect bus, the Peripheral Component Interconnect bus and a central processing unit being connected by a bridge chip having a freeze-on error option, the method comprising:
causing an error to be injected into the Peripheral Component Interconnect bus slot;
determining a status of the Peripheral Component Interconnect bus slot during the error injection;
causing the injected error within the Peripheral Component Interconnect bus slot to be reset;
determining a status of the Peripheral Component Interconnect bus slot after the injected error is reset by writing a first data pattern to the Peripheral Component Interconnect bus slot having an adapter disposed therein and determining whether the adapter returns the first data pattern; and
evaluating an error recovery capability of the Peripheral Component Interconnect bus slot by examining the status of the Peripheral Component Interconnect bus slot during error injection and after error injection is reset.

* * * * *